(12) United States Patent
Nam et al.

(10) Patent No.: US 12,572,635 B2
(45) Date of Patent: Mar. 10, 2026

(54) SEAT DEPARTURE MANAGEMENT METHOD AND DEVICE USING BIOMETRIC INFORMATION TEMPLATE

(71) Applicant: CUBOX CO, LTD., Seoul (KR)

(72) Inventors: Yong Han Nam, Seoul (KR); Un Sung Nam, Seoul (KR)

(73) Assignee: CUBOX CO, LTD., Seoul (KR)

( * ) Notice: Subject to any disclaimer, the term of this patent is extended or adjusted under 35 U.S.C. 154(b) by 39 days.

(21) Appl. No.: 18/688,927

(22) PCT Filed: Mar. 28, 2022

(86) PCT No.: PCT/KR2022/004295
§ 371 (c)(1),
(2) Date: Mar. 4, 2024

(87) PCT Pub. No.: WO2023/033288
PCT Pub. Date: Mar. 9, 2023

(65) Prior Publication Data
US 2025/0005122 A1     Jan. 2, 2025

(30) Foreign Application Priority Data

Sep. 2, 2021     (KR) ........................ 10-2021-0116675

(51) Int. Cl.
*G06F 21/32*          (2013.01)
*H04L 9/40*           (2022.01)
(52) U.S. Cl.
CPC .......... *G06F 21/32* (2013.01); *H04L 63/0807* (2013.01)

(58) Field of Classification Search
CPC ............................ G06F 21/32; H04L 63/0807
See application file for complete search history.

(56) References Cited

U.S. PATENT DOCUMENTS

2012/0005736 A1     1/2012  Takahashi et al.
2020/0027091 A1*    1/2020  Hassani .............. H04L 63/0807

FOREIGN PATENT DOCUMENTS

JP      2004-013831 A      1/2004
KR   10-2008-0028597 A     4/2008
KR   10-2014-0138991 A     12/2014
KR      10-1916301 B1      11/2018
KR   10-2020-0074525 A     6/2020
(Continued)

OTHER PUBLICATIONS

International Search Report for PCT/KR2022/004295 mailed Dec. 5, 2022 from Korean Intellectual Property Office.
(Continued)

*Primary Examiner* — Barbara B Anyan
(74) *Attorney, Agent, or Firm* — Paratus Law Group, PLLC

(57)          ABSTRACT

A seat departure management method includes: collecting, by a local device provided in a seat, biometric information of a user during a period in which the user is seated in the seat; requesting, by an authentication server communicating with the local device, the biometric information at a specific time during the period in which the user is seated; extracting, by the authentication server, a feature point using the biometric information at the specific time; and matching, by the authentication server, the extracted feature point with a pre-registered template.

11 Claims, 4 Drawing Sheets

(56) References Cited

FOREIGN PATENT DOCUMENTS

| KR | 10-2021-0068749 | A | 6/2021 |
|----|----|----|----|
| KR | 10-2266157 | B1 | 6/2021 |

OTHER PUBLICATIONS

Korean Office Action for related KR Application No. 10-2021-0116675 mailed Apr. 6, 2023 from Korean Intellectual Property Office.
Japanese Office Action for related JP Application No. 2024-514014 mailed May 7, 2025 from Japan Patent Office.
Extended European Search Report for related EP Application No. 22864797.0 mailed Jun. 6, 2025 from European Patent Office.

\* cited by examiner

SEAT DEPARTURE MANAGEMENT METHOD AND DEVICE USING BIOMETRIC INFORMATION TEMPLATE

CROSS-REFERENCE TO RELATED APPLICATIONS

This Application is a National Stage Patent Application of PCT International Application No. PCT/KR2022/004295 (filed on Mar. 28, 2022), which claims priority to Korean Patent Application No. 10-2021-0116675 (filed on Sep. 2, 2021), which are all hereby incorporated by reference in their entirety.

BACKGROUND

The disclosed technology relates to a method and device for managing identity verification and seat departure using a template generated based on biometric information of a user.

The human body contains various types of biometric information such as fingerprints, the voice, the face, the irises, and veins. Since the biometric information is unique information, an authentication technology using this information has been widely used. In particular, such biometric information has recently been widely used to authenticate a user identity in remote locations, such as in non-face-to-face meetings, working from home, and online education.

As non-face-to-face service environments increase, changes are occurring even in existing service use environments. An existing work environment, where work is performed within the same physical space, is changing to a desktop as a service (DaaS) environment where users access their computing resources anytime and in any place, free from time and space constraints. Representative examples include communication dongles with a built-in virtual desktop infrastructure (VDI) or hardware-based virtual private network. In the DaaS-based work environment, because users can access internal computer resources anytime and in any place, security for the users should be further strengthened and managed more thoroughly. To solve this problem, it is necessary to provide a fundamental blocking function against system use by unauthorized users by not only authenticating basic user access, but also aperiodically confirming authentication information through biometric information in a time series of authenticated users.

Meanwhile, biometric information extracted from specific body parts is converted into data and used. This biometric information is called a template, and users are authenticated by a method of comparing a pre-registered template with a template acquired and extracted from an online terminal.

SUMMARY

The disclosed technology relates to a method and device for managing identity verification and seat departure using a template generated based on biometric information of a user.

According to a first aspect of the disclosed technology, a seat departure management method using a biometric information template includes: collecting, by a local device provided on a seat, biometric information of a user during a period in which the user is seated in the seat; requesting, by an authentication server communicating with the local device, the biometric information at a specific time during the period in which the user is seated; extracting, by the authentication server, a feature point using the biometric information at the specific time; and matching, by the authentication server, the extracted feature point with a pre-registered template.

According to a second aspect of the disclosed technology, a seat departure management device using a biometric information template includes: a sensor module that is provided on a seat in which a user is seated and collects biometric information during a period in which the user is seated in the seat; a communication device that communicates with an authentication server for authenticating the biometric information; and a computing device that selects biometric information for a specific time requested by the authentication server during the period in which the user is seated in the seat and transmits the selected biometric information to the authentication server through the communication device, and receives an authentication result of the authentication server through the communication device and determines whether the user is a user who has pre-registered a template.

Embodiments of the disclosed technology may have effects including the following advantages. However, since this does not mean that the embodiments of the disclosed technology should include all of the following effects, the scope of rights of the disclosed technology should not be understood as being limited thereto.

A seat departure management method and device using a biometric information template according to an embodiment of the disclosed technology have the effect of checking whether a user seated in the seat is the user himself/herself using the template.

In addition, by processing seat departure management aperiodically and irregularly, it is possible to prevent unregistered users from attending on behalf of others.

DETAILED DESCRIPTION

Since the present invention may be variously modified and have several exemplary embodiments, specific exemplary embodiments will be illustrated in the accompanying drawings and be described in detail in a detailed description. However, it is to be understood that the present invention is not limited to a specific exemplary embodiment, but includes all modifications, equivalents, and substitutions without departing from the scope and spirit of the present invention.

Terms such as "first," "second," "A," "B," and the like may be used to describe various components, but the components are not to be interpreted to be limited to the terms, which are used only for distinguishing one component from other components. For example, a first component may be named a second component and a second component may also be similarly named a first component, without departing from the scope of the present invention. The term "and/or"

includes a combination of a plurality of related described items or any one of the plurality of related described items.

In the terms used in this specification, singular expressions should be understood to include plural expressions unless they are clearly interpreted differently in the context. It will be further understood that the terms "include" and the like specify the presence of stated features, steps, operations, components, parts, or a combination thereof, but do not preclude the presence or addition of one or more other features, numerals, steps, operations, components, parts, or a combination thereof.

Prior to the detailed description of the drawings, it is intended to clarify that the components in this specification is only distinguished by the main functions of each component. That is, two or more components to be described below may be combined into one component, or one component may be divided into two or more for each subdivided function.

In addition, each of the constituent parts to be described below may additionally perform some or all of the functions of other constituent parts in addition to the main functions of the constituent parts, and some of the main functions of the constituent parts may be performed exclusively by other components. Therefore, the presence or absence of each component described throughout this specification should be interpreted functionally.

Figure 1:
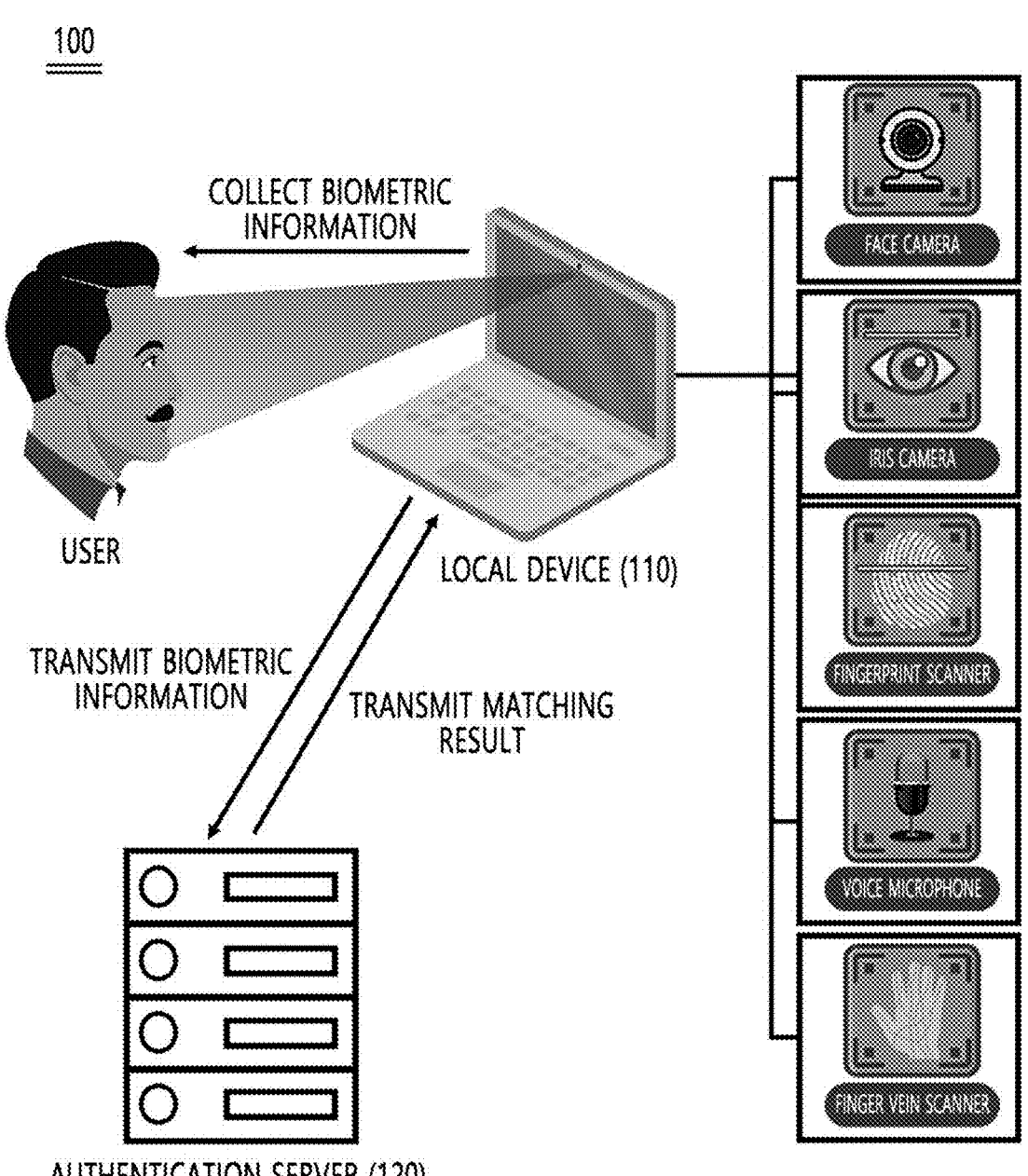
FIG. 1 is a diagram illustrating a process of managing a user's seat departure using a biometric information template according to an embodiment of the disclosed technology.

FIG. 1 is a diagram illustrating a process of managing a user's seat departure using a biometric information template according to an embodiment of the disclosed technology. As illustrated in FIG. 1, a system 100 consists of a local device 110 and an authentication server 120. The local device 110 is a device that is provided on a user's seat and collects biometric information of the user. Although a laptop computer is used as an example in FIG. 1, devices such as a smartphone or a personal computer (PC) may be used, or a dedicated device provided separately for user authentication may be used. This local device 110 is provided with a sensor to collect the biometric information of the user. The biometric information of the user may include at least one of a facial feature point, an iris feature point, a fingerprint feature point, a voice, and a finger vein feature point. In order to collect a plurality of different pieces of biometric information, the local device may be provided with a plurality of sensors. For example, the local device may include a camera that collects face images or iris images, and a scanner that collects fingerprint images.

Meanwhile, as described above, the biometric information of the user may be feature points extracted from each specific body part. These feature points may be extracted from images taken of the specific body parts. Accordingly, the sensors provided in the local device 110 include an image sensor (camera) that acquires the images by capturing the specific body parts. In addition, a microphone that receives the voice may also be provided to use the feature points of the voice. In addition, means such as a finger vein scanner or a fingerprint scanner may also be provided. The local device 110 may collect a plurality of different pieces of biometric information using all the provided biometric information collection means depending on a setting value set in advance by a system administrator, and may collect a specific type of biometric information or only some of the biometric information depending on the setting value.

Meanwhile, the local device 110 collects the biometric information only during the period in which the user is seated. Here, the information on the period in which the user is seated in the seat may be received through the authentication server 120. For example, the local device 110 is connected in advance to the authentication server 120 by wire or wirelessly to enable communication with the authentication server 120, and receive a meeting time or attendance time that the system administrator or meeting host inputs to the authentication server 120 in advance as the period in which the user is seated.

Meanwhile, for the user authentication, a template for the user is registered based on biometric information at the time the user is first seated. Here, the template is data that compresses data capacity by encoding feature points extracted from the biometric information of the user. The template is generally used to process authentication for multiple users through transmission and reception of less data by considering that the amount of processed data increases as types of biometric information collected in a biometric-based authentication system increase. In order to register such a template, the authentication server 120 may receive the biometric information from the local device 110 at the time the user is first seated, extract feature points, and register the template for the user after the encoding process.

Meanwhile, when the above-described template registration process is performed, the local device 110 may continue to collect the biometric information of the user. Since the local device 110 cannot know in advance when the authentication server 120 will request the biometric information at a specific time to authenticate the user himself/herself, it is preferable to continuously repeat a short cycle or continuously collect the biometric information. The authentication server 120 may determine that a time randomly selected in the period in which the user is seated is a specific time for authenticating the user himself/herself.

Meanwhile, authenticating the user himself/herself involves determining whether the user who is currently seated in a seat is the same person as the user who has previously gone through the template registration process. For example, there may be a case where user A registers a template at the time the user is first seated, but after a certain period of time has elapsed, there may be cases where user B may attend on behalf of the user. In this case, as long as the authentication system simply determines whether the user is seated or has left the seat, it may be determined that there are no problems with the current situation. However, in reality, since another user is representing the attendance, the authentication server 120 may determine whether the user is the user himself/herself by matching a pre-registered template with feature points extracted from biometric information at a specific time to solve this problem. In an embodiment, the authentication server 120 may determine whether the user is the user himself/herself by comparing a similarity between the feature points acquired by decoding the template and the feature points extracted from the biometric information.

Meanwhile, the local device 110 receives the matching result from the authentication server 120. The matching result may be information indicating whether the user is the user himself/herself. Here, when the user who registers the template and the user who is currently seated in the seat are the same person, it means that the feature point matching result similarity is high. In addition, when the user who registers the template and the user currently seated in the seat are different people, this means that the feature point matching fails because the feature point matching result similarity is low or there is no user in the seat. When the matching result of the authentication server 120 corresponds to low similarity or feature point matching failure, the local device 110 may determine that the user who registers the template has departed from the seat. In addition, the seat departure time of the user who has departed from the seat may be recorded.

Meanwhile, the seat departure time may correspond to the case where the user departs from his/her seat temporarily, such as going to the bathroom or making an urgent phone call, but may correspond to the case where the user departs from his/her seat for a long period of time, such as departing from the seat completely or having a substitute attendee sit. Accordingly, the local device 110 may continue to collect the biometric information for a set period of time, but record both the time the user departs from the seat and the time the user returns to the seat. For example, the period from the time the user departs from the seat to the time the user returns to the seat may be recorded as the seat departure period of the user. When the user does not return to his/her seat, an end time of the period in which the user is seated in the seat may be recorded as the time the user returns to the seat. The local device 110 may receive a matching result for the continuously collected biometric information from the authentication server 120 and determine when the user departs from the seat and when the user returns to the seat, depending on the result of matching success or failure. Of course, it is also possible for the local device 110 to record the seat departure period by directly performing the same template authentication as the authentication server 120.

Figure 2:
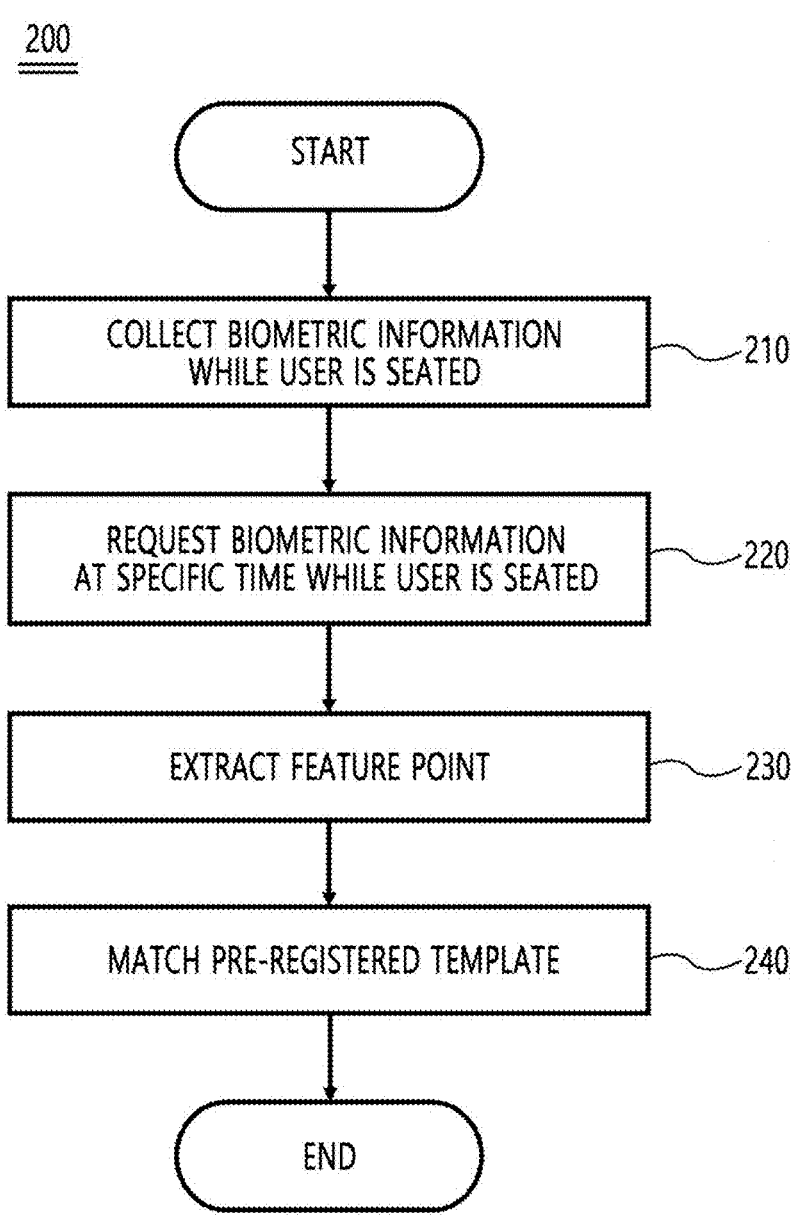
FIG. 2 is a flowchart of a seat departure management method using a biometric information template according to an embodiment of the disclosed technology.

FIG. 2 is a flowchart of a seat departure management method using a biometric information template according to an embodiment of the disclosed technology. Referring to FIG. 2, the seat departure management method 200 using a biometric information template may be sequentially performed between the local device and the authentication server.

In operation 210, the local device collects the biometric information of the user during the period in which the user is seated in the seat. As the biometric information of the user, the face, fingerprints, irises, finger veins, voice, etc., is collected through multiple sensors provided in the local device.

Meanwhile, prior to performing operation 210, an operation of registering the user's template is performed. In an embodiment, after the feature points of the biometric information collected at time the user is first seated in the seat are extracted, the template for authenticating the user himself/herself may be registered after the encoding process. When multiple users attend the meeting, each user may go through the template registration process through the local device provided on his/her seat.

In operation 220, the authentication server requests the biometric information at a specific time during the period in which the user is seated. The period in which the local device collects the biometric information is the period in which the user is seated in the seat, and may be input to the authentication server by the system administrator or meeting host. The authentication server requests the biometric information from the local device at a specific time during this period. In an embodiment, the biometric information may be requested at a randomly determined specific time during the period in which the user is seated.

In operation 230, the authentication server extracts the feature points using the biometric information at a specific time. To extract the feature points of the biometric information, the conventional feature point extraction algorithm or pre-trained feature point extraction model may be used.

In operation 240, the authentication server matches the extracted feature points with the pre-registered template. In the authentication server, the template for each user is registered according to the template registration process performed before operation 210. The authentication server decodes the user's template to acquire the feature points and matches the feature points extracted from the biometric information at a specific time received from the local device to authenticate the user himself/herself.

Figure 3:
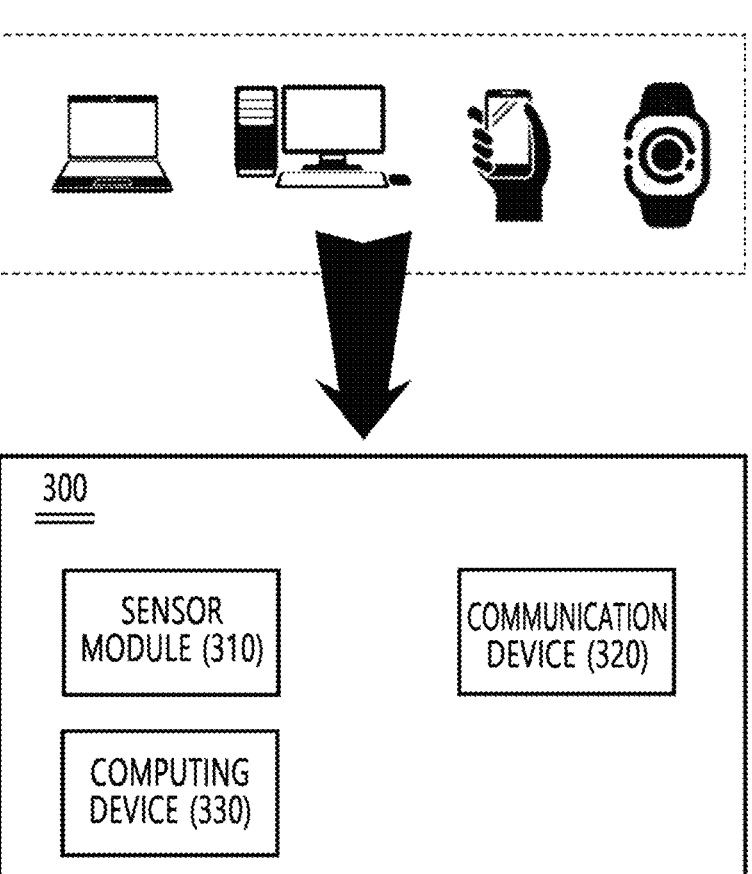
FIG. 3 is a block diagram of a seat departure management device using a biometric information template according to an embodiment of the disclosed technology.

FIG. 3 is a block diagram of a seat departure management device using a biometric information template according to an embodiment of the disclosed technology. Referring to FIG. 3, a seat departure management device 300 using a biometric information template includes a sensor module 310, a communication device 320, and a computing device. The seat departure management device 300 may be the local device described above. The seat departure management device 300 may be implemented in various forms such as a laptop computer, a PC, a smart device, and a wearable device.

The sensor module 310 is provided on the seat in which the user is seated and collects the biometric information during the period in which the user is seated in the seat. The sensor module includes a plurality of sensors that each collect a plurality of pieces of biometric information on the user. For example, the sensor module may include an optical camera, a scanner, and a microphone.

The communication device 320 communicates with the authentication server that authenticates the biometric information. The communication device transmits the biometric information at a specific time to the authentication server according to the request of the authentication server. Depending on the system construction environment, the communication device may communicate with the authentication server by wire or wirelessly.

The computing device 330 may be implemented by a processor or central processing unit (CPU) of the seat departure management device 300. The computing device 330 selects the biometric information for a specific time requested by the authentication server while the user is seated in the seat and transmits the selected biometric information to the authentication server through the communication device. Then, the authentication result of the authentication server is received through the communication device to determine whether the user is the user who pre-registers the template.

Meanwhile, the seat departure management device 300 may be implemented as a program (or application) including an executable algorithm that can be executed on a computer. That is, it may be a program that is executed on a computer. The program may be stored and provided in a non-transitory computer readable medium.

The non-transitory computer-readable medium is not a medium that stores data therein for a while, such as a register, a cache, a memory, or the like, but is a medium that semi-permanently stores data therein and is readable by a device. Specifically, various applications or programs described above may be provided by being stored in non-transitory readable media such as a compact disk (CD), a digital video disk (DVD), a hard disk, a Blu-ray disk, a universal serial bus (USB), a memory card, a read-only memory (ROM), a programmable ROM (PROM), an erasable PROM (EPROM), an electrically erasable PROM (EEPROM), or a flash memory.

The transitory readable media are various RAMs such as a static RAM (SRAM), a dynamic RAM (DRAM), a synchronous DRAM (SDRAM), a double data rate SDRAM (DDR SDRAM), an enhanced SDRAM (ESDRAM), a synclink DRAM (SLDRAM), and a direct rambus RAM (DR-RAM).

Figure 4:
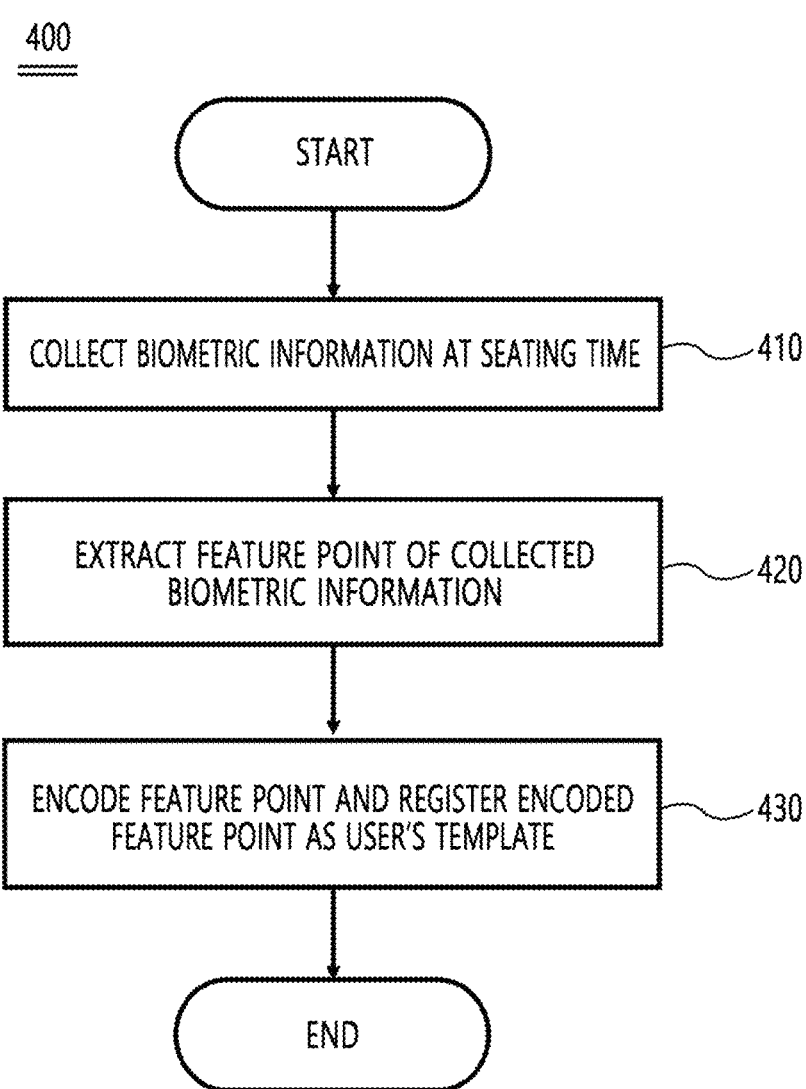
FIG. 4 is a flowchart illustrating an operation of registering a template.

FIG. 4 is a flowchart illustrating an operation of registering a template. Referring to FIG. 4, each local device provided for each seat may perform a template registration operation when the user is seated in the seat.

First, in operation 410, the local device collects the biometric information at the time the user is seated. The local device may collect different types of biometric information, such as the face, irises, and fingerprints of a user, using a plurality of sensors. The type and number of pieces of biometric information collected may be set in advance by a system administrator.

Next, in operation 420, the authentication server extracts feature points of the collected biometric information. The authentication server may receive the biometric information from the local device at the time the user is seated. In addition, the feature points included in the biometric information may be extracted using a feature point extraction algorithm or a feature point extraction model.

Finally, in operation 430, the authentication server encodes the extracted feature points and registers the encoded feature points as the user's template. The authentication server may perform the encoding process to reduce the capacity of the extracted feature points or to prevent the extracted feature points from leaking to the outside. The encoded feature point may be registered as the template for the identity authentication of each user.

The seat departure management method and device using a biometric information template according to embodiments of the disclosed technology have been described with reference to embodiments illustrated in the drawings to help understanding, but this is merely illustrative, and those of ordinary skill in the art will understand that various modifications and other equivalent embodiments are possible. Accordingly, the true technical scope of the disclosed technology is to be determined by the spirit of the appended claims.

The invention claimed is:

1. A seat departure management method using a biometric information template, comprising:
    collecting, by a local device provided in a seat, biometric information of a user during a period in which the user is seated in the seat;
    requesting, by an authentication server communicating with the local device, the biometric information at a specific time during the period in which the user is seated;
    extracting, by the authentication server, a feature point using the biometric information at the specific time; and
    matching, by the authentication server, the extracted feature point with a pre-registered template.

2. The method of claim 1, wherein the collecting of the biometric information includes registering a template at a time the user is first seated, and
    the registering of the template includes:

collecting, by the local device, the biometric information of the user;
    receiving, by the authentication server, the biometric information and extracting the feature point; and
    encoding the extracted feature point and registering the encoded feature point as a template for the user.

3. The method of claim 1, wherein the collecting of the biometric information includes collecting each of a plurality of different pieces of biometric information using a plurality of sensors provided in the local device.

4. The method of claim 1, wherein the local device receives information on the period in which the user is seated through the authentication server.

5. The method of claim 1, wherein the authentication server determines that a randomly selected time during the period in which the user is seated is the specific time.

6. The method of claim 1, wherein the matching of the extracted feature point includes comparing a similarity between a feature point acquired by decoding the template and a feature point extracted from the biometric information.

7. The method of claim 1, wherein the local device receives a result of the matching from the authentication server, and when it is determined according to the result that the user is not a user who has registered the template, records a seat departure time for the user who has registered the template.

8. A seat departure management device using a biometric information template, comprising:
    a sensor module that is provided in a seat in which a user is seated and collects biometric information during a period in which the user is seated in the seat;
    a communication device that communicates with an authentication server for authenticating the biometric information; and
    a computing device that selects biometric information for a specific time requested by the authentication server while the user is seated in the seat and transmits the selected biometric information to the authentication server through the communication device, and receives an authentication result of the authentication server through the communication device and determines whether the user is a user who has pre-registered a template.

9. The device of claim 8, wherein the sensor module includes a plurality of sensors that each collect a plurality of pieces of biometric information on the user.

10. The device of claim 8, wherein the computing device receives information on the period in which the user is seated through the authentication server.

11. The device of claim 8, wherein the computing device records a seat departure time for the user who has registered the template when it is determined that the user is not the user who has pre-registered the template according to the authentication result of the authentication server.

\* \* \* \* \*